United States Patent [19]

Sweet et al.

[11] 4,068,769

[45] Jan. 17, 1978

[54] CARGO BOX

[75] Inventors: Philip J. Sweet; Buck C. Hamlet; David L. Sweet, all of Fresno, Calif.

[73] Assignee: American Carrier Equipment, Fresno, Calif.

[21] Appl. No.: 792,774

[22] Filed: May 2, 1977

Related U.S. Application Data

[63] Continuation of Ser. No. 592,788, July 2, 1975, abandoned.

[51] Int. Cl.² .............................................. B60P 1/36
[52] U.S. Cl. ............................... 214/83.18; 116/28 R; 214/83.36; 296/56; 298/23 M
[58] Field of Search ......................... 214/83.36, 83.18; 296/56

[56] References Cited

U.S. PATENT DOCUMENTS

| 1,989,125 | 1/1935 | Atwell | 214/83 |
| 2,082,673 | 6/1937 | Williamson | 214/83.36 |
| 2,668,629 | 2/1954 | Dahlman | 214/83.36 |
| 2,788,927 | 4/1957 | Hoffstetter | 214/83.36 |
| 3,212,656 | 10/1956 | Kamin | 296/38 |
| 3,228,351 | 1/1966 | Flowers | 296/28 D |
| 3,247,983 | 4/1966 | Thompson | 214/83.36 |
| 3,247,985 | 4/1966 | Scardoni | 214/82 |
| 3,404,918 | 10/0968 | Lackey | 298/23 M |
| 3,481,647 | 12/1969 | Cook | 214/83.36 |
| 3,924,558 | 12/1975 | Grazia | 116/28 R |

Primary Examiner—Robert G. Sheridan
Attorney, Agent, or Firm—Huebner & Worrel

[57] ABSTRACT

An improved cargo box particularly suited for use in transporting compacted cargo, such as refuse. The cargo box is characterized by a pair of vertically oriented side walls disposed in a pair of forwardly converging planes, a floor of a planar configuration inclined rearwardly, a conveyor traversing the floor including a plurality of endless chains, each being characterized by a plurality of mutually spaced T-bars rigidly affixed thereto, a discharge opening disposed in a transverse plane at the rear end of the box, above the conveyor, a drive unit mounted at the rear of the box, beyond the confines thereof, and a pivotal door, for closing the discharge opening, supported in suspension by a cantilevered pivot in a manner such that the door normally gravitates to an open position.

22 Claims, 9 Drawing Figures

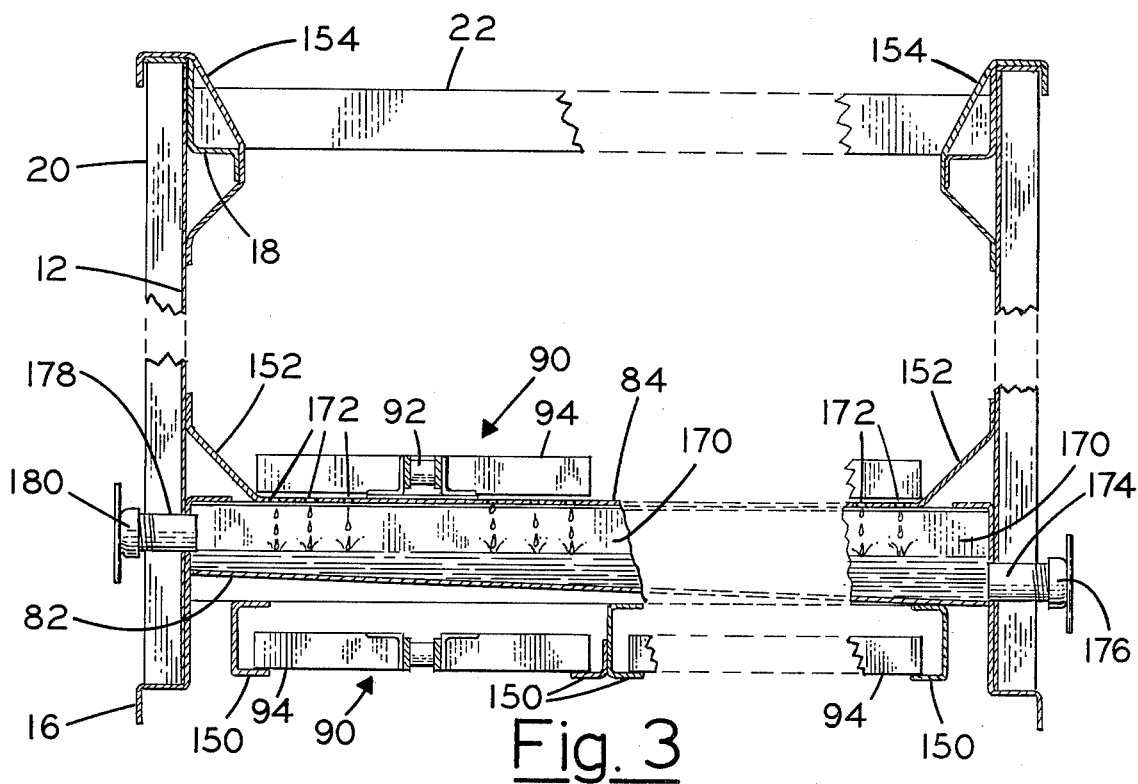
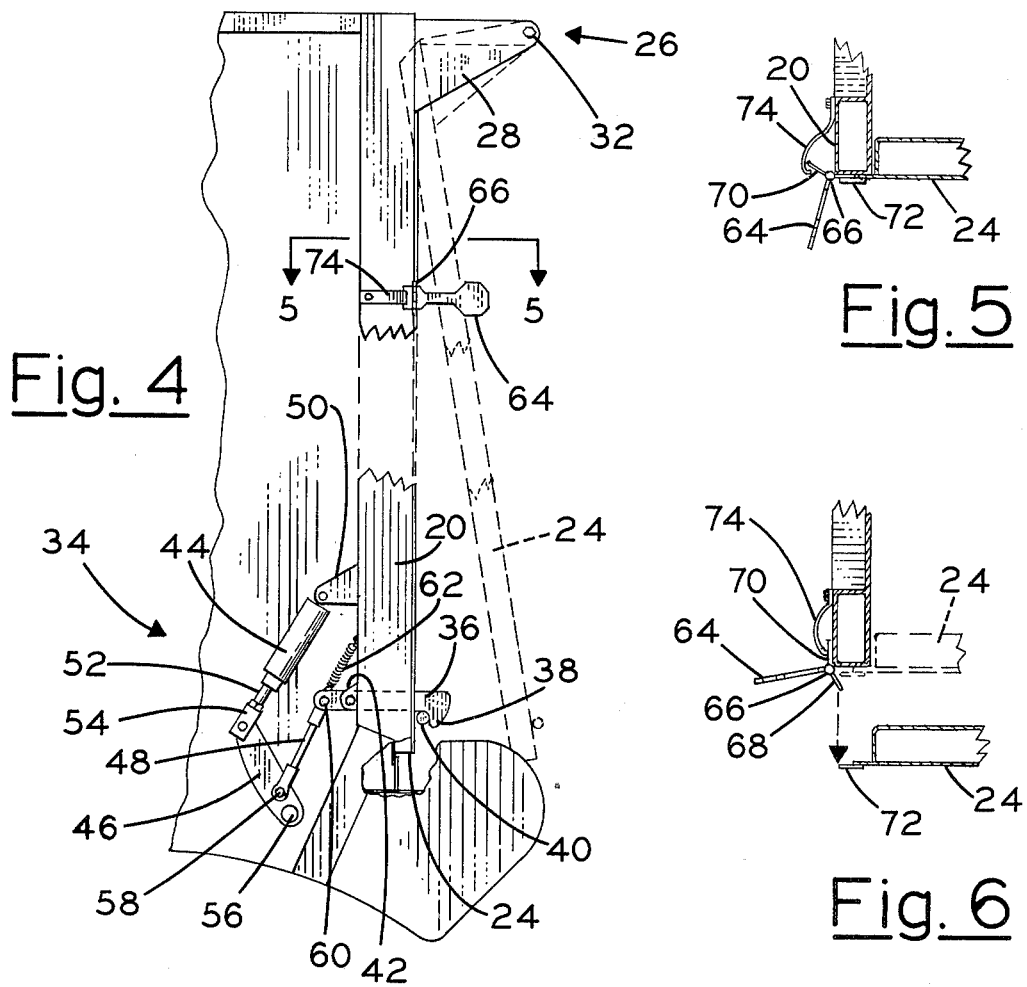

CARGO BOX

CROSS REFERENCE TO A RELATED APPLICATION

This application is a Continuation of U.S. patent application Ser. No. 592,788, filed July 2, 1975, now abandoned on an invention entitled "AN IMPROVED CARGO BOX."

BACKGROUND OF THE INVENTION

1. Field of the Invention

The invention generally relates to cargo boxes and more particularly to a cargo box for an overland vehicle particularly suited for use in transporting compacted, bulk refuse.

2. Description of the Prior Art

The prior art is replete with cargo boxes for vehicles employed in transporting bulk cargo, such as refuse, in compacted configurations. Among the cargo boxes heretofore employed in transporting bulk cargo, such as refuse and the like, are pivotal dump boxes supported in a manner which facilitates a discharge of its contents through a tipping of the box, and bottom dump boxes which open along the bottom thereof for permitting the contents to gravitate vertically.

Currently, substantial attention is being devoted to the disposal of refuse such as rubbage and similar materials in non-burning modes. Among the various techniques now being employed in the disposal of refuse, is that of employing refuse in land-fill projects wherein refuse is used to fill ravines, washes and the like and then covered over for purposes of reclaiming the land for other uses.

Of course, land-fill projects normally entail a delivery of great quantities of refuse to areas remote from a center of refuse collection. Therefore, it is common practice to employ vehicles equipped with relatively large cargo boxes capable of transporting loads of suitable proportions from collection centers to land-fill projects remote from the collection centers.

Since the bulk to mass ratio of refuse is substantially greater than the bulk to mass ratio of other types of cargo, such as gravel and the like, it is possible to transport large quantities of refuse employing vehicles equipped for highway operations. Therefore, elongated cargo boxes mounted on semi-trailer suspension systems have been employed in transporting refuse from collection centers to land-fill projects.

Designers of such vehicles continuously have been plagued by problems related to the unloading of such vehicles. For example, in order for a vehicle of the type hereinbefore mentioned to fulfill existing needs, it is necessary that the vehicle possess a capability of depositing loads in precise locations within time periods of minimal durations. Moreover, the discharge of contents must be complete in order to avoid excessive labor costs in sweeping-out the cargo box. Unfortunately, the principles often employed in the design of dump boxes cannot be applied, simply because of the length of the cargo box tends to prohibit a use of pivotal dump boxes and the bulk of the loads tends to prohibit a use of bottom-dump systems. In those instances where conveyors extended along the bottom of a cargo box have been proposed for rearwardly discharging contents from a cargo box, damage to the conveyors has been experienced in view of excessive stress developed by loads applied thereto as the conveyors are advanced through relatively long distances in order to effectively discharge the contents.

Moreover, a great deal of difficulty has been encountered in completely discharging loads of refuse in time periods of minimal duration utilizing conveyors extended along the floor of cargo boxes. Additionally, since refuse normally includes relatively large, heavy fragments of materials such as broken concrete, tree trunks and the like, a conveyor situated along the bottom of a cargo box is subjected to destructive impact as loads of refuse are delivered thereto from loading vehicles.

Damage to conveyors, of course, can and often do result in substantial loss of operational time. Due to the economic investment in rolling-stock, time lost in performing repairs imposes a substantial economic burden on those paying for transport services.

Finally, it is desirable for a refuse vehicle to possess the capabilities for rapid and complete discharge of contents in order to reduce labor costs and turn-around time.

It is, therefore, the general purpose of the instant invention to provide an improved cargo box particularly suited for use in effectively and economically transporting refuse from collection centers, normally located in urban areas, to remote areas at which refuse disposal is completed, such as in areas at which reclamation through land-fill projects is being achieved.

OBJECTS AND SUMMARY OF THE INVENTION

It is, therefore, an object of the instant invention to provide an improved cargo box which overcomes the aforementioned difficulties and disadvantages.

It is another object to provide an improved cargo box particularly suited for use in transporting and discharging refuse.

It is another object to provide an improved cargo box particularly suited for use in transporting and rapidly discharging, at precise locations, large loads of bulk cargo in a compacted configuration.

It is another object to provide an improved cargo box for use in transporting compacted loads of refuse adapted to rapidly discharge the load without subjecting discharge conveyors to excessive stress.

It is another object to provide an improved cargo box having a pair of vertically oriented side walls disposed in a pair of converging planes, a floor disposed in an inclined plane and an elongated floor conveyor for facilitating discharge of compacted loads of bulk cargo without unduly stressing the floor conveyor.

It is another object to provide in an overland vehicle adapted to be employed in transporting refuse, a cargo box having an inclined floor, a pair of converging side walls, and a floor conveyor extended along the upper surface of the floor of the box comprising a plurality of endless chains, each being characterized by a plurality of T-bars extended transversely thereof, and a readily removable drive unit for the conveyor.

Another object is to provide an improved elongated cargo box particularly suited for use in transporting refuse although not necessarily restricted thereto, since the cargo box embodying the instant invention may find utility in transporting loads other than refuse.

These and other objects and advantages are achieved through the use of an improved cargo box having a pair of converging side walls, and inclined floor extended beyond a transverse discharge opening provided between the walls, a floor conveyor including a plurality of independent endless chains, each being characterized by a plurality of T-bars extended transversely thereof and affixed thereto, and a pivotal door suspended from a cantilever pivot in a manner such that the door is biased by its weight to an open position, as will hereinafter be more readily apparent by reference to the following description and claims in light of the accompanying drawings.

BRIEF DESCRIPTION OF THE DRAWINGS

FIG. 3 is a fragmented, cross-sectional view, taken generally along line 3—3 of FIG. 1.

FIG. 4 is a fragmented partially sectioned, side elevational view of the rear end of the cargo box.

FIG. 5 is a fragmented, cross-sectional view, taken generally along line 5—5 of FIG. 4.

FIG. 6 is a fragmented cross-sectional view, similar to FIG. 5, but with the structure therein shown being illustrated in an alternate position.

DESCRIPTION OF THE PREFERRED EMBODIMENT

Figure 1:
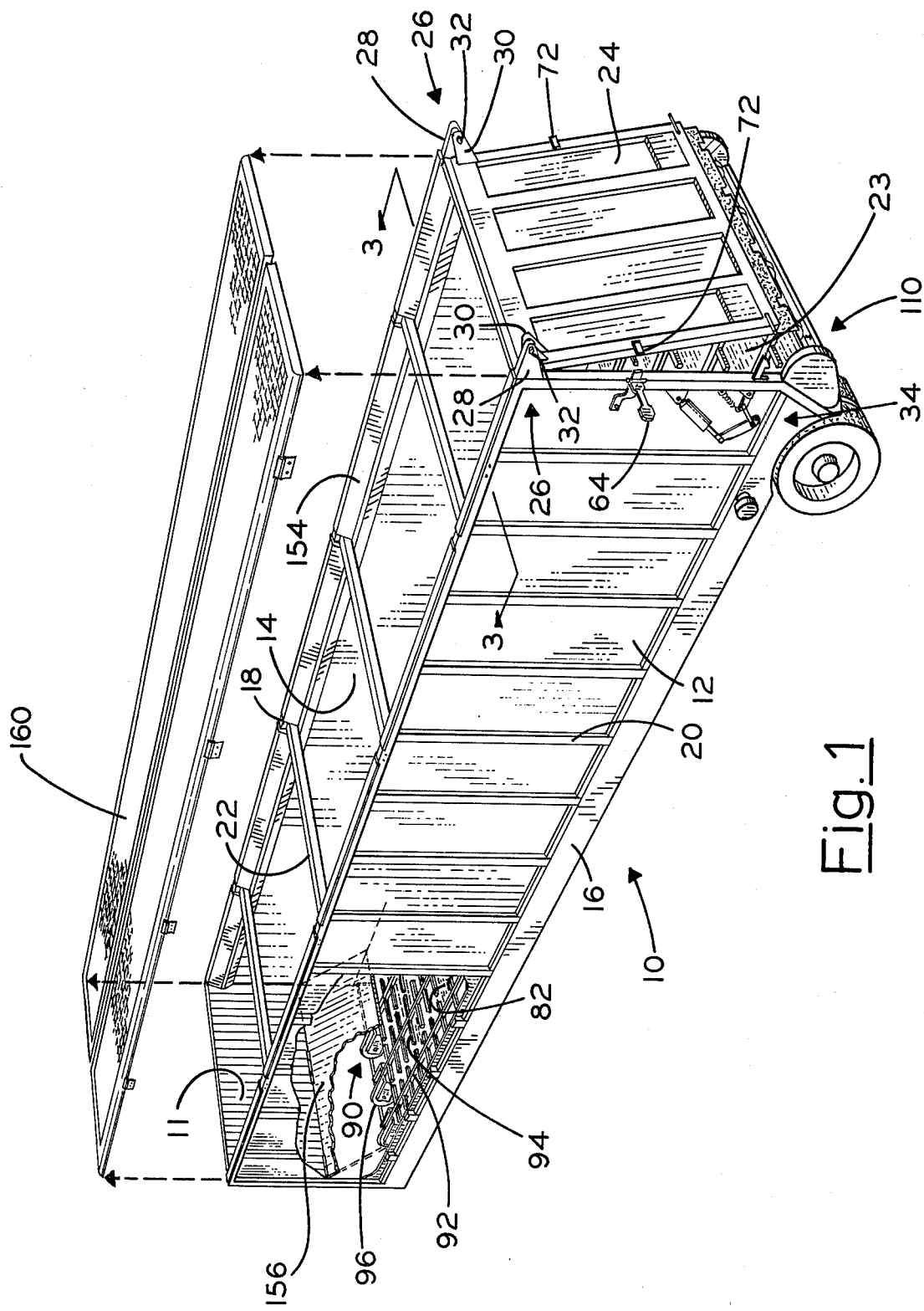
FIG. 1 comprises a partially exploded, fragmented, perspective view of a cargo box, which embodies the principles of the instant invention, having a tapered configuration, a floor conveyor extended through a discharge opening adapted to be closed by a pivotal door.

Referring now with more particularity to the drawings, wherein like reference characters designate like or corresponding parts throughout the several views, there is shown in FIG. 1 a cargo box, generally designated 10, which embodies the principles of the instant invention.

The cargo box 10 is fabricated from stock sheet metal employing fabrication techniques, such as welding and the like, well understood by those familiar with the fabrication of cargo boxes for overland vehicles such as trucks, trailers and the like. Moreover, while the cargo box 10 is illustrated as being supported by a suspension system, not designated, of a type frequently employed in supporting semi-trailers, it is to be understood that the cargo box 10 can be employed as a cargo box for a truck, full trailer and similar vehicles.

The cargo box 10 includes a transversely oriented front wall 11 and a pair of vertically oriented side walls 12 and 14, of planar configurations, which extend the length of the cargo box. As a practical matter, each of the side walls is supported by a stringer 16 extended therebeneath and a stringer 18 extended thereabove and a plurality of vertical support members 20, of flanged channular configurations, sometimes referred to as hat-section configurations, extended between the stringers. Additionally, a plurality of mutually spaced tension bars 22 is extended between and affixed to the stringers 18 located at opposite sides of the box. These bars function as tie-bars and maintain the spacing between the side walls 12 and 14 substantially uniform. Where so desired, similar supports are provided for the front wall 11.

It should be appreciated fully that the internal surfaces of the side walls 12 and 14 are of substantially planar and uninterrupted configurations, whereby friction between loads and these surfaces is reduced as a load is advanced therealong in order to facilitate a rapid and practical discharge of contents from the cargo box.

It is also important to note that the side walls 12 and 14 are arranged in uniformly converging planes having a minimal spacing at front or leading end of the cargo box 10, and maximum spacing at the rear or discharge end of the cargo box. The purpose of the converging relationship of the planes within which the side walls 12 and 14 are disposed is to facilitate discharge of a compacted load as will hereinafter become more readily apparent.

At the rear or discharge end of the cargo box 10, there is provided a discharge opening 23 through which discharge of contents from the box is, in operation, achieved. This opening, in turn, is closed by a door 24 comprising a planar panel suspended by a pair of suspension mechanisms, each being generally designated 26, of a dog-leg configuration which permit the door 24 to be biased by its mass to a normally open position with respect to the opening 23.

Each of the suspension mechanisms 26 includes a bracket affixed at its base to one of the side walls 12 and 14 and projected rearwardly therefrom in a coplanar relation with the side wall to which it is affixed. Additionally, each of the mechanisms 26 includes another bracket 30 which is affixed at its base to the door 24, near the uppermost edge portion thereof, and projected normally therefrom in a plane arranged in mutual parallelism with the plane of the brackets 28. It will, of course, be understood that the brackets 28 and 30, of each suspension mechanism 26, are in juxtaposition, whereby the ends of the brackets 28 and 30 are disposed in alignment. Through the ends of the brackets there is provided a plurality of coaxially aligned openings or bosses through which is extended a pair of pivot pins 32 which serves to couple the brackets 28 and 30, of each suspension mechanism 26 in pivotal relation. Thus, the pair of suspension mechanisms 26 serves to support the door 24 for angular displacement about an axis spaced rearwardly from the opening 23. Since the brackets 30 are rigidly affixed to the door 24 forwardly of the pivot pins 32, the door is biased by its mass to a position such that the center of the mass lies beneath the axis when the door is in an unrestrained configuration. This position is illustrated in FIG. 1.

In order to restrain the door 24 in a closed configuration with respect to the opening 23, there is provided a pair of simultaneously operable latching mechanisms, each being generally designated 34, each of which is mounted on one of the side walls 12 and 14 near the opening 23. Since the latching mechanisms 34, of the aforementioned pair of latching mechanisms, are of a common design and construction, and function in a similar manner to achieve a similar result, it is believed that a detailed description of a single one of the latching mechanisms 34 is sufficient to provide a complete understanding of the instant invention.

Each latching mechanism 34, FIG. 4, includes a pivotal dog 36 mounted on the rearmost vertical support member 20 for the side wall to which it is affixed. As a practical matter, the dog 36 is extended rearwardly from the wall and terminates in a downwardly projected fluke 38 provided at its distal end. This fluke serves to engage and capture a locking pin 40 rigidly secured to the door 24 and extended laterally therefrom for thus restraining the door in a closed relationship with the opening 23. In practice, the dog 36 is supported for pivotal motion by a suitable coupling 42 affixed to the aforementioned rearmost support member 20.

In order to impart angular displacement to the pivotal dog 36, in an upward direction for thus releasing the pin 40, there is provided a dog actuating linkage, not designated, which includes a pneumatic actuator 44 interconnected with the dog through connecting links 46 and 48.

The actuator 44, as shown, comprises an air-operated ram, the base of which is pivotally connected with the side wall of the box 10 through a suitable bracket 50 welded or otherwise secured to the rearmost support member 20. The actuator 44 includes a downwardly inclined, axially extensible shaft 52 which terminates in a clevis 54 pivotally connected with one end of the connecting link 46, the opposite end of which is pivotally connected to the side wall through a pivot pin 56 extended therethrough. It is to be understood that the connecting link 46 is a pivotal link and that the pivot pin 56 serves to establish a pivotal axis located beneath the end of the pivotal dog 36 remote from the fluke 38. The connecting link 48 is, in turn, pivotally connected at one end with the connecting link 46, near the pivot pin 56, and at the other end thereof to the pivotal dog 36, at the end thereof remote from the fluke 38, at a pivot point, designated 60, in spaced relation with the coupling 42.

It should, therefore, be appreciated that as axial extension is imparted to the shaft 52, the connecting link 46 is angularly displaced, downwardly, about the pivot pin 56 for tensioning the connecting link 48, whereupon the pivotal dog 36 is angularly displaced about the axis of the pivotal coupling 42 for thus lifting the fluke 38. The pin 40 thus is released by the dog 36 so that the door 24 is thus permitted to swing freely about the pivot pin 32. Consequently, the door is now unrestrained and caused to advance to its normally open position under the influence of its mass.

In order to assure that the pivotal dog 36 is continuously urged in angular displacement toward its normal position, wherein the fluke 38 is positioned to engage the locking pin 40, there is provided a tension spring 62 extended between and affixed to the dog 36, near the pivot point 60, and the support member 20 on which the dog is mounted.

In order for an operator of a vehicle equipped with the box 10 to be advised of the instantaneous position of the door 24, relative to the opening 23, there is provided a visual indicator comprising a spring-biased flag 64. This flag is supported for pivotal motion about a vertical axis established by a pivot pin 66 mounted on the rearmost edge of the rearmost support members 20 located at the opposite sides of the opening 23.

Each of the flags 64 includes an elongated body, not designated, terminating in a bifurcation comprising legs 68 and 70 which intersect at the pivot pin 66. The leg 68 is angularly related to the plane of the body of the flag 64 and is positioned to be engaged by a lip 72 projected laterally from the door 24, while the leg 70 is continuously engaged by a resilient element comprising a leaf spring 74. This spring functions as a torsion spring for continuously urging the flag 64 to pivot outwardly, about the pivot pin 66, and away from the plane of the wall to which it is attached. Thus, the flag is urged to pivot into a line of vision for an operator of the vehicle to which the cargo box 10 is affixed.

Of course, it is to be understood that as the lip 72 of the door 24 engages the leg 68, the flag is pivoted in a reversed direction, out of the line of vision of the operator, into a substantially coplanar relationship with the wall of the box 10 to which it is attached. Thus, the flag 64 continuously serves to provide visual intelligence indicative of the position of the door 24 relative to the discharge opening 23.

The actuators 44 of the pair of latching mechanisms 34 are connected in a parallel circuit with an on-board air supply, not shown, via a solenoid valve 76. The solenoid 76 is, in turn, controlled by a toggle switch 78 preferably provided in the cab of the vehicle equipped with the box 10. Thus, an operator of the vehicle is afforded access to a control circuit through which release of the latching mechanism 34 is controlled.

The design of the circuit employed for controlling the pair of latching mechanisms 34 is varied as desired. However, it is preferred to connect the pressure side of the actuators 44 with the solenoid valve 76, via a three-way air switch conveniently located with respect to the door 24. In practice, the three-way air switch includes a pressure, an exhaust and a lock position. This switch can be mounted externally of the cargo box 10, near the rear thereof so that not only must an operator close the toggle switch 78 but an assistant must close the three-way switch 80 in order to avoid an unfortuitous operation of the actuators 44. Of course, a suitable tubing is employed in fabricating the circuit in a manner well understood by those familiar with the fabrication of pneumatic circuits.

Figure 2:
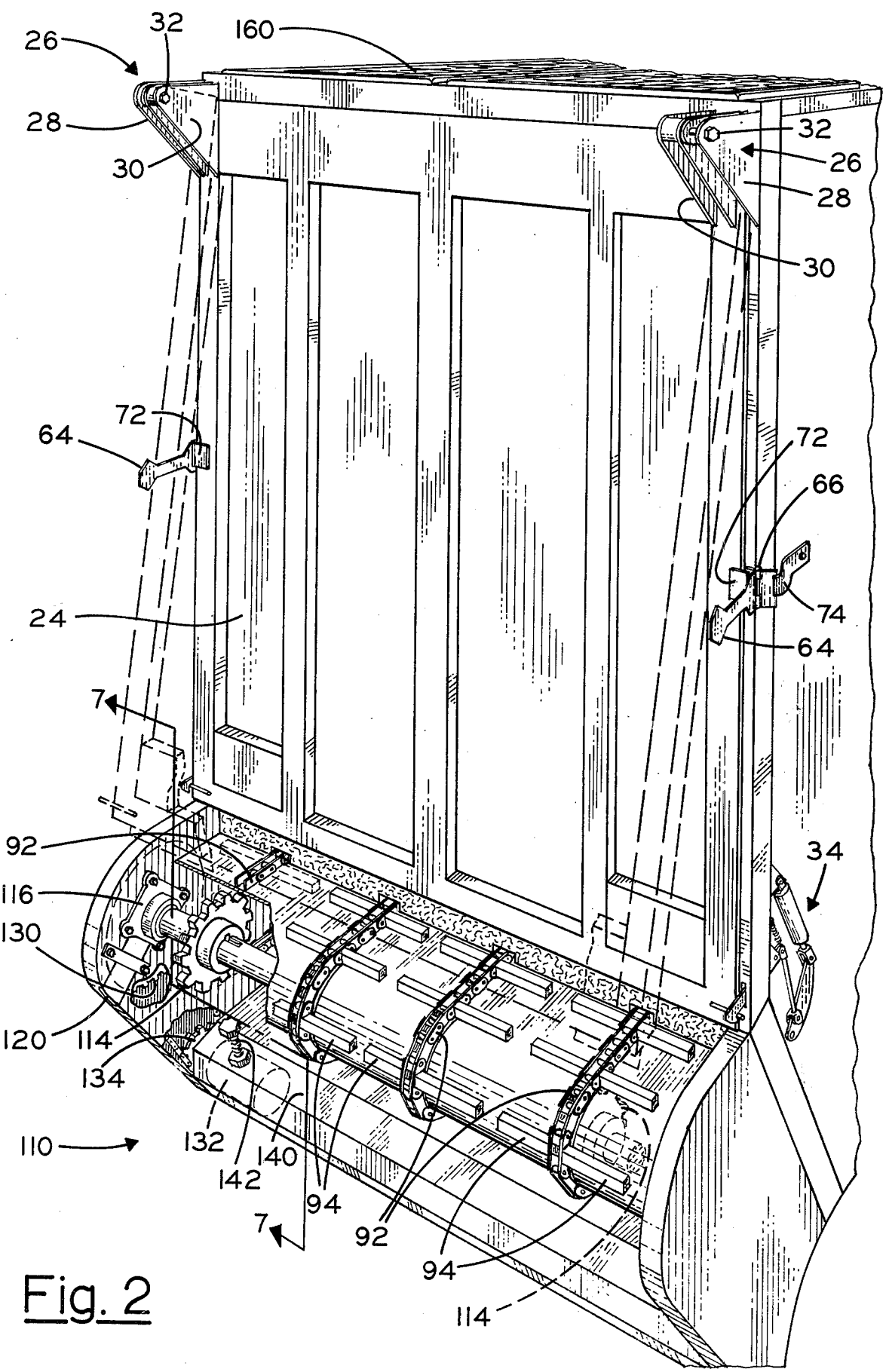
FIG. 2 comprises a fragmented, perspective view, illustrating the rear end of the cargo box shown in FIG. 1 on an enlarged scale.

Turning again to FIG. 1, it is noted that the cargo box 10 is provided with a floor 82. The floor 82 includes a floor plate 84, also of a substantially uninterrupted, planar configuration, supported by a plurality of transversely oriented supports, not shown, also of hat-shaped cross-sectional configurations. It is here important to note that the floor 82 is oriented in a plane inclined downwardly toward the rear of the box. Moreover, it is important to note that the floor extends beneath and beyond the discharge opening 23 of the cargo box, as best illustrated in FIGS. 1 and 2.

Extended along the upper surface of the floor plate 84, is a floor conveyor, generally designated 90. The floor conveyor 90 includes a plurality of independent conveyor chains 92 arranged in parallelism. Each of the conveyor chains 92 is of an endless configuration and includes a plurality of T-bars 94 rigidly fixed to selected links of the chains and extended transversely thereof.

As best illustrated in FIG. 1, each of the conveyor chains 92 is trained about one of a plurality of idler sprocket assemblies 96 provided at the front end of the box 10. Each of these assemblies includes a sprocket wheel 98 mounted on a stub axle 99 supported by a pair of spaced journal bearings 100 supported by a carriage 101 adjustably supported, in turn, by a pair of laterally spaced, forwardly projected bracket members 102. The members 102 are rigidly mounted on a beam 104 transversely related to the front or leading end of the floor 82.

In order to facilitate a tightening of each of the conveyor chains 92, independently of the other chains of the plurality, each is provided with a screw-threaded adjustable stop 106. Each stop 106 is received in a pair of aligned screw-threaded bodies 108 welded or otherwise rigidly affixed to the transverse beam 104, with one end of the stop being disposed in an abutted relation with a carriage 101.

By axially displacing a selected adjusting stop 106, the adjacent carriage 101 is moved forwardly, or permitted to move rearwardly, as desired. In practice, suitable studs are affixed to the carriages 101 and extended through suitably formed slots, not designated, formed in the brackets 102. Thus, each of the carriages is adapted to be affixed to the carriage 101 for purposes of securing the idler sprocket assembly 96 in place whereby the chain 92 trained thereabout is appropriately tensioned.

Figure 7:
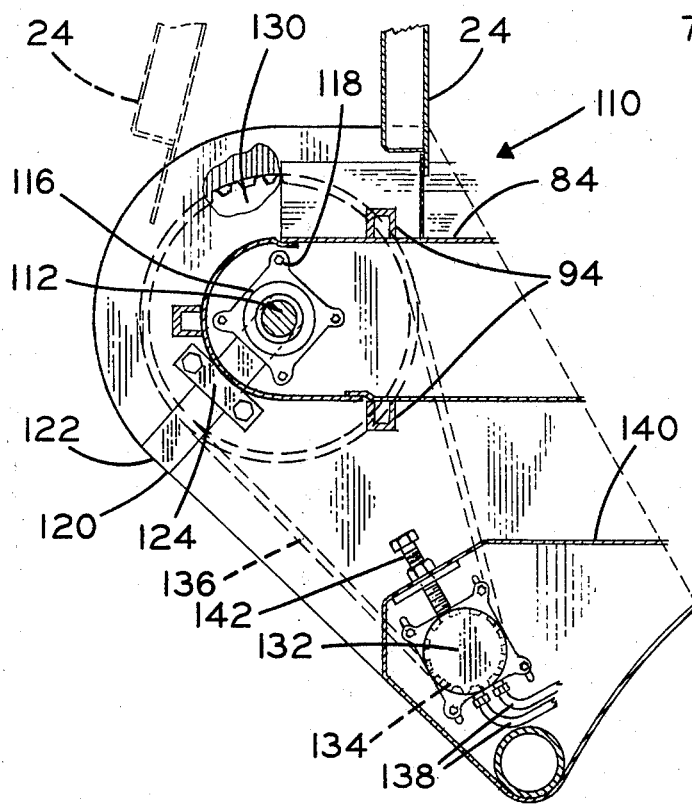
FIG. 7 is a fragmented, cross-sectional view, taken generally along line 7—7, illustrating a drive unit provided for advancing the floor conveyor shown in FIG. 1.
Figure 9:
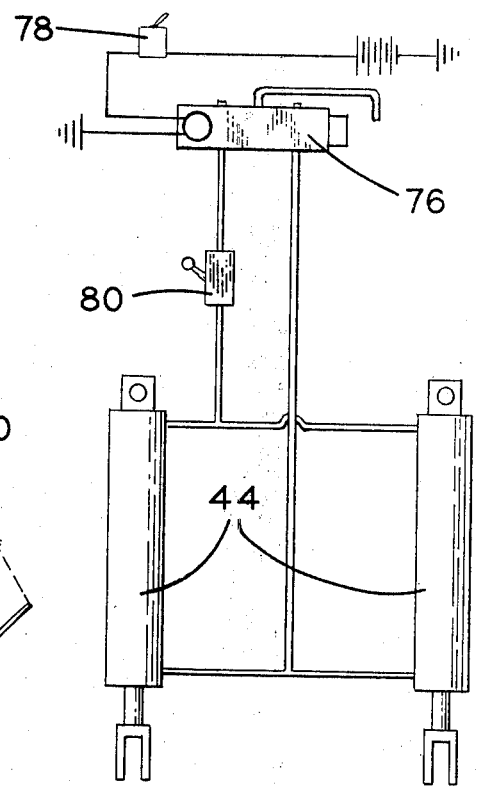
FIG. 9 is a schematic view illustrating an electric-air circuit, including a pair of pneumatic actuators, provided for releasing the door for the discharge opening of the cargo box shown in FIG. 1.
Figure 8:
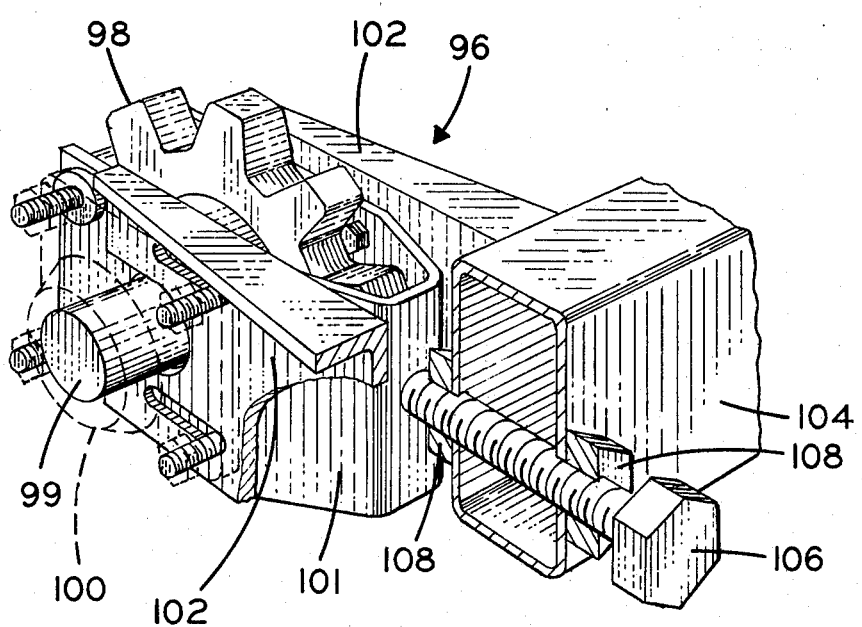
FIG. 8 is a perspective, partially sectioned and fragmented view illustrating, partially in phantom, an idler sprocket provided for supporting one of the chains of the floor conveyor shown in FIG. 1.

At the rear of the floor conveyor 90 there is provided a drive unit, generally designated 110 which is, in operation, employed for purposes of advancing the conveyor 90 along the floor 82 of the cargo box 10. The drive unit 110 includes a shaft 112, FIG. 7, upon which is mounted a plurality of sprockets 114, FIG. 2. The opposite ends of the shaft 112 are supported by a pair of journal bearings 116. The bearings 116 are mounted and secured in place by suitable bolts 118 extended through apertures formed in the housing for the journal bearings 116 and received by the frame, not designated, of the cargo box. It is important here to note that in order to accommodate a rapid disassembly, and a subsequent assembly, of the drive unit 110, the frame for the cargo box is provided with an elongated, inclined slot 120 which is configured to accept the ends of the shaft 112. A removable stop 122 is provided to be received within each of the slots 120 for securing the ends of the shaft 112 in place, once they have been inserted into the frame. A suitable keeper 124, which may be welded to the stop, is provided for securing each of the stops 122 in place.

Rotary motion is imparted to the shaft 112 through a sprocket wheel 130 rigidly affixed to one end of the shaft 112 in concentric relation therewith. The sprocket wheel 130 is secured to the shaft 112 by any suitable means, including a key and keyway coupling. In spaced relation with the sprocket wheel 130 there is provided an hydraulic motor 132 suitably supported by the frame of the cargo box 10.

As a practical matter, the hydraulic motor 132 is provided with a sprocket wheel 134 about which is trained an endless chain 136, also trained about the sprocket wheel 130. Consequently, once the hydraulic motor 132 is activated, the chain 136 is advanced in response to rotary motion imparted to the sprocket wheel 130 for thus imparting rotary motion to the shaft 112 and, consequently, the sprockets 114 mounted thereon. The motor 132 is connected within a suitable hydraulic circuit, not illustrated, through suitable tubing 138 in a manner well understood by those familiar with the assembly of hydraulic systems. Furthermore, it is to be understood that the motor 132 is supported by a suitable plate, not designated, supported by a fairing 140. A stop 142 is provided for facilitating position adjustment for the motor 132.

In view of the foregoing, it is to be understood that once the motor 132 is energized, the sprocket wheel 134 is driven in rotation, whereupon the sprocket wheel 130 is driven, responsively, through the chain 136 for thereby imparting rotary motion to the shaft 112, and the sprockets 114, for advancing the conveyor chains 92 simultaneously for thus causing the conveyor 90 to advance along the upper surface of the floor plate 84.

It is here important to note that because the floor conveyor 90 extends beyond the discharge opening 23 of the cargo box 10, contents being discharged from the box are conveyed completely through the discharge opening and, therefore, beyond the cargo box 10. Thus, a complete discharge of the contents of the box is assured. It is also important to note that the floor conveyor 90 is open to the environment at the rearmost end thereof, so that contents, such as refuse, adhering to the floor conveyor as it passes from above to beneath the floor 82, are transported beyond the box and permitted to gravitate to the ground, rather than be entrapped in the box. Thus, a complete discharge of the contents from the box is insured.

It is also important to note that beneath the floor 82 there is provided a plurality of tracks 150, FIG. 3, which engage the T-bars 94 only at the ends thereof. Thus, the T-bars are supported as they are transferred from the rear of the cargo box 10 to the front thereof. Moreover, each of the lower runs of the conveyor chains 92 is also open to the environment so that refuse which may adhere to the chains 92, as they pass from above to below the floor 82, is permitted to fall downwardly to the ground, without being reintroduced into the cargo box at the front end thereof.

With a view to further avoidance of an entrapment of contents within the cargo box 10, there is provided along each side of the floor conveyor 90 an elongated fairing 152. Each of the fairings 152 is inclined with respect to the floor plate 84 so that the internal surfaces of the side walls 12 and 14, in effect, are inclined near the floor plate. Similarly, a fairing 154 is extended along each of the upper edges of the cargo box 10 for thus providing a substantially continuous inclined surface which precludes collection of contents along the upper edges of the side walls.

As shown in FIG. 1, an inclined access door 156 is pivotally suspended from the front wall 11 and rests upon the fairings 152, just above the floor conveyor, so that the idler sprocket assemblies 96 are protected from the contents of the cargo box. Thus, entrapment of the contents within the box 10 is further precluded.

In order to assure that contents are confined within the cargo box 10, during transport, there is provided a pair of screen doors 160. Each is pivotally mounted by suitable hinges, not designated, mounted along the top of the side walls 12 and 14. It will be understood that the screen doors 160 are supported for pivotal motion from a position above the cargo box to an outwardly extended position, whereby access to the interior of the cargo box 10 is afforded for loading purposes.

It should be appreciated that once a resilient cargo, such as refuse, including rubbish and the like, has been loaded within the cargo box 10, and compacted, there is a tendency for the cargo to "swell" or expand and frictionally "bind" or adhere to the side walls and floor of the cargo box 10. Consequently, a load of refuse possesses a propensity to become bound or fixed in place due to the frictional engagement of the refuse with the internal surfaces of the cargo box. However, due to the inclination of the floor plate 84 and the divergence of the walls 12 and 14 of the cargo box, slight motion, in a rearward direction, of the floor conveyor 90 is sufficient to release the cargo from frictional engagement with the side walls of the cargo box. The conveyor floor then transports the contents through the discharge opening 23 with minimal stress being developed therein and with minimal attendant loading of the drive unit 110.

Additionally, it should be understood that often a load of refuse, such as rubbish and the like, contains water and other liquids, which percolate through the load. This can and does become troublesome, since it is highly desirable if not imperative that draining of such liquids along streets and highways be avoided. Consequently, there is provided near the rear end of the cargo box, between the upper and lower runs of the floor conveyor, a tank 170. This tank communicates with the interior of the cargo box 10, via a myriad of apertures 172 formed in the floor plate 84. These apertures permit water percolated through the contents of the cargo box to be collected within the tank 170.

A drain 174 closed by a closure cap 176 is provided for draining fluids from the tank 170. An additional drain 178 having a cap 180 is provided, where desired, for assisting in draining and flushing the tank 170.

It also is important to appreciate that even though large massive objects such as broken slabs of concrete and the like are, during loading, dropped from substantial heights above the floor conveyor 90, the floor conveyor tends to suffer little damage due to the fact that T-bars 94 do not serve to interconnect the various conveyor chains 92.

Moreover, in the event one of the chains of the floor conveyor is broken, or a T-bar bent, the floor conveyor is permitted to continue to operate for discharging the load. Consequently, in the event that one or more of the chains 92, or a T-bar 94, are damaged, the operation of the floor conveyor 90 is not severely impaired. Furthermore, due to the fact that the drive unit 110 is supported within the slot 120, rapid disassembly of the drive unit is facilitated, since the chains 92 can be readily uncoupled and the drive shaft 112 "dropped" through the slots.

OPERATION

It is believed that in view of the foregoing description, the operation of the device will readily be understood and it will be briefly reviewed at this point.

With the cargo box 10 assembled in the manner hereinbefore described, it is prepared for operation by towing to a loading device or the like.

At the loading ramp, usually located at a collection center, smaller pickup refuse vehicles are discharged into the cargo box 10.

Once the cargo box 10 has been properly loaded with refuse and suitably compacted, the cargo box is transported to an area at which unloading occurs, such as rural areas within which land-fill projects are being carried on. In the event that during transport water or other liquids percolate through the refuse forming the load of cargo, the liquids are permitted to drain down the inclined floor of the cargo box and pass through the apertures 172 to be collected within the tank 170, whereby spillage is avoided.

The operator of the vehicle now backs the cargo box 10 into a position for discharge of the load through the discharge opening 23. The toggle switch 78 and the three-way air switch 80 are now closed for causing the actuators 44 to become energized, simultaneously, for axially extending the shafts 52 thereof. The dogs 36 are responsively pivoted through operation of the linkage which includes the links 46 and 48. Thus, the locking pin 40 is released from the flukes 38 of the dogs 36, whereupon the forces of gravity acting on the mass of the door causes the arms of the brackets 30 to pivot downwardly about the pivot pins 32. Thus the door is moved to an unrestrained configuration in which the door is inclined away from the opening 23, as illustrated in FIG. 1.

As a consequence of the gravity induced displacement of the door, the door is removed from the path of the contents of the cargo box, prior to activation of the drive unit 110, and hence prior to the conveyor 90 being activated. Since the dimensions of the door 24 are substantial, the weight of the door is substantial. By removing the door from engagement with the contents of the cargo box, prior to the drive unit 110 being activated, the weight of the door does not serve to place a load on the chains 92 as they are advanced from their initial or starting positions. Ultimately, of course, the door is engaged and lifted by the contents of the cargo box as the conveyor advances so that the weight of the door tends to place a load on the chains 92. This occurs, however, only after the contents are released from their frictionally bound condition, due to the expanding shape of the box, and, therefore, at such time loading, as a loading of the chains 92, is minimal. Thus excessive loading of the chains 92 is avoided at a critical moment in the operation of the conveyor 90.

As the door 24 pivots away from the discharge opening 23, the torsion spring 74 causes the flag 64 to pivot outwardly into the line of vision of the operator. The operator now energizes the motor 132, through a suitable selector valve, not shown, whereupon the drive unit 110 is activated for causing the shaft 112 to rotate for advancing the chains 92 of the floor conveyor 90 in unison. The stress thus developed in the chains of the floor conveyor 90 is maximized at the instant the chains begin to advance. Immediately thereafter, the load of cargo is released from its bound condition, due to the angular relationship of the side walls 12 and 14 and the inclination of the floor 82.

As the floor conveyor 90 is advanced along the floor plate 84, the load of refuse is advanced by the conveyor through and beyond the discharge opening 23, prior to its being dropped or permitted to gravitate to the ground. Due to the openness of the lower run of the floor conveyor, as it is supported by the tracks 150, and the effects of the fairings 152, 154 and the inclination of the access door 156, the refuse is substantially completely discharged from the cargo box 10, all without additional labor. Once the load is completely discharged, an operator merely advances the door 24 into a closed relationship with the opening 23, whereupon the flag is removed out of the line of the operator's vision and the cargo box thus prepared for refilling.

In view of the foregoing, it should readily be apparent that the cargo box 10 which embodies the principles of the instant invention provides a practical solution to the problem of providing suitable transport devices for refuse such as rubbish and the like, to land-fill projects and the like.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. In an elongated cargo box for transporting compacted contents having a pair of substantially vertically oriented converging side walls extended between opposite ends of the box, and an inclined floor extending the length of the box, between the side walls thereof, and characterized by a first width and a first height dimension near a first end thereof, the improvement comprising:

means defining in said box at a second end thereof, a contents discharge opening of a substantially rectangular configuration disposed in a plane transversely related to the longitudinal plane of symmetry of said cargo box and characterized by a second width and a second height dimension greater than said first width and said first height dimension, movable conveyor means extended rearwardly along the surface of the floor and projected through said contents discharge opening for conveying contents beyond the limits of the box, and closure means for said opening including a closure panel of a substantially planar configuration displaceable between a contents confining configuration wherein the panel is disposed between the rearward end of said conveyor and the contents discharge opening and a contents discharge configuration wherein the panel is disposed in a rearwardly spaced relation with the opening and suspension means arranged in rearwardly spaced relation with said opening including support members extending rearwrdly from opposite sides of said opening, mounting means affixed to said panel, and coupling means pivotally coupling said mounting means to said support members in rearwardly spaced relation with said opening supporting said closure panel for mass-induced pivotal displacement from its contents confining configuration to a contents discharge configuration about a horizontal axis located in rearwardly spaced relation with the opening.

2. The improvement of claim 1 wherein the center of mass of said panel is disposed in axially spaced relation with said box when the closure panel is in a contents discharge configuration.

3. The improvement of claim 2 wherein said closure panel is supported in suspension by means including a first pair of bracket arms rigidly affixed to said box and projected therefrom in spaced parallelism and a second pair of bracket arms rigidly affixed to said closure panel and projected substantially normally therefrom, and pivot means interconnecting the distal ends of said arms in spaced relation with the plane of said opening.

4. The improvement of claim 1 wherein said movable conveyor comprises a plurality of endless chains arranged in spaced parallelism and extended from said box beyond the plane of said discharge opening, idler means externally related to said box and disposed near one end of the box including a plurality of mutually spaced idler sprockets for receiving said plurality of endless chains and a power unit disposed near the opposite end of said box in spaced relation therewith for advancing said chains, including a drive shaft externally related to the box having a plurality of drive sprockets mounted thereon for receiving said plurality of chains, and driving means connected with said drive shaft for driving the shaft in rotation.

5. The improvement of claim 4 wherein each chain of said plurality includes a plurality of orthogonally related T-bars mounted thereon in mutually spaced parallelism.

6. The improvement of claim 4 wherein said box includes an open-top filling opening and pivotal cover means for closing filling opening disposed in a substantially horizontal plane and said floor is disposed in a plane inclined with respect to the plane of said cover means.

7. The improvement of claim 3 further comprising means for providing intelligence indicative of the position of the closure panel relative to the discharge opening, including a pivotal flag mounted on said box having a leg disposed in the path of said closure panel.

8. The improvement of claim 3 further comprising means for releasably securing said closure panel in said contents confining configuration, comprising a latching pin affixed to the closure panel and means for releasably capturing said latching pin including a ram-actuated, spring-biased latching dog.

9. The improvement of claim 3 further comprising a holding tank disposed beneath said floor in juxtaposition with said discharge opening and communicating with said cargo box for capturing fluids percolated through the contents of the box.

10. The improvement of claim 3 further comprising a stringer extended along the upper portion of each of said side walls for imparting rigidity thereto, and a fairing affixed to each of said side walls in protective relation with the said stringer affixed thereto.

11. In an elongated cargo box for an overland vehicle having a longitudinal axis extended between the front and rear ends thereof and particularly suited for use in transporting bulk cargo, such as refuse, the improvement comprising:

a pair of vertically oriented side walls disposed in a pair of forwardly converging planes, an inclined floor of a planar configuration inclined downwardly toward the rear end of the cargo box, means defining at the rear end of the cargo box a discharge opening disposed in a vertical plane, an endless conveyor for advancing bulk along the floor of said cargo box including a plurality of conveyor chains extended through the discharge opening, each of said chains being characterized by an upper and a lower run, a plurality of T-bars extended transversely of each of said chains and rigidly affixed thereto, and means for closing said discharge opening including an angularly displaceable door, cantilevered pivot means spaced rearwardly of the plane of said opening a distance sufficient for supporting said door in suspension for gravitation from a vertical disposition to an inclined disposition wherein the panel is inclined away from the opening, including support members extending rearwardly from the opposite sides of said opening, mounting means affixed to said door and coupling means pivotally coupling said mounting members to said support members in rearwardly spaced relation with said discharge opening, a spring biased latching dog for securing said door in a closed configuration, and means for releasing said door for angular displacement toward an open position wherein the door is inclined away from the plane of said opening.

12. The vehicle of claim 11 further comprising visual indicator means for providing intelligence indicative of a closed configuration for said door.

13. The vehicle of claim 11 wherein said means for releasing said door includes an air-actuated ram having an axially displaceable output shaft connected with said dog and said door is biased by its mass to a normally open position.

14. In an elongated cargo box for an overland vehicle, particularly suited for use in hauling refuse, characterized by a discharge opening disposed in a substantially vertical plane, the improvement comprising:
   A. a closure panel for said opening continuously biased by its own mass in angular displacement away from a closed position in which said panel obstructs said opening; and
   B. cantilevered suspension means for supporting said panel for angular displacement including a first pair of bracket arms mounted on the upper portion of said box and projected rearwardly therefrom in mutually spaced parallelism, a second pair of bracket arms mounted on the upper portion of said closure panel and projected rearwardly therefrom in contiguous relation with said first pair of bracket arms, and means disposed in displaced relation with said discharge opening pivotally connecting the extended end portions of said first pair of arms to the extended end portions of said second pair of arms for supporting said panel in pivotal suspension for mass-induced angular displacement about an axis arranged in spaced relation with said discharge opening.

15. The improvement of claim 14 further comprising a spring biased latching dog for securing said closure panel against angular displacement away from said closed position, means for releasing said panel for angular displacement, and indicator means for providing intelligence indicative of the position of said panel relative to said discharge opening.

16. The improvement of claim 14 further comprising a holding tank disposed beneath the floor of the cargo box in juxtaposition with one end thereof and communicating therewith for capturing fluids percolated through the contents of the box.

17. In an overland vehicle having a longitudinal axis extending between the front and rear ends thereof, particularly suited for use in transporting bulk cargo, an elongated cargo box having a longitudinal axis extended in parallelism with the longitudinal axis of the vehicle comprising:
   A. a pair of vertically oriented side walls disposed in a pair of forwardly converging planes, a floor of a planar configuration, conveyor means for advancing bulk cargo along said cargo box including a plurality of chains, each being characterized by upper and lower runs extended between the ends of the cargo box, a plurality of T-bars extended transversely of each of said chains and rigidly affixed thereto, and means defining at the rear end of said cargo box a discharge opening disposed in a transverse plane;
   B. a drive unit mounted at the rear end of said cargo box including a drive shaft, a plurality of coaxially aligned sprockets mounted on said drive shaft for receiving the plurality of chains, journal means for supporting said drive shaft at each of its opposite ends, and means for releasably coupling said journal means to said box; and
   C. an angularly displaceable door for closing said discharge opening, cantilevered pivot means spaced rearwardly of said opening for supporting said door in suspension, a spring biased latching dog for securing said door in a closed configuration, means for releasing said door for angular displacement, and visual indicator means for providing intelligence indicative of a closed configuration for said door.

18. The vehicle of claim 17 further comprising means including tracks extended in spaced parallelism beneath said floor in supporting engagement with the opposite ends of said T-bars for supporting the chains along the lower runs thereof.

19. The vehicle of claim 17 wherein said means for releasing said door includes an air-actuated ram having an axially displaceable output shaft connected wih said dog.

20. The vehicle of claim 19 wherein said door is biased by its mass to a normally open position.

21. In combination with a cargo box for an overland vehicle characterized by a vertically oriented, rear discharge opening closure means adapted to alternately engage and disengage contents of said box for first confining contents of the box and then accommodating a discharge of the contents through said vertically oriented opening, comprising:
   A. a planar closure panel for said discharge opening moveable between a closed position wherein the panel is vertically disposed in engaged relation with contents of the box and an open position wherein the panel is inclined away from the opening in substantially disengaged relation with the contents of the box; and
   B. suspension means for supporting said panel for angular displacement between said closed and open positions including a first pair of arms rigidly mounted on the upper portions of the box and projected in a rearward horizontal direction away from opposite sides of said opening, a second pair of arms rigidly mounted on the upper position of said closure panel and projected in parallelism therefrom and characterized by end portions disposed in contiguous relation with the extended end portions of said first pair of arms, and means disposed in displaced relation with said discharge opening pivotally connecting the extended end portions of said first pair of arms to the contiguous end portions of said second pair of arms for supporting said panel in pivotal suspension at a distance from said opening such that the weight of the panel causes the panel to move downwardly about an axis arranged in spaced relation with said discharge opening and away from the discharge opening a distance sufficient for substantially disengaging the contents of the cargo box.

22. The closure means of claim 21 further comprising a spring biased latching dog for securing said closure panel against angular displacement away from said closed position, means for releasing said panel for angular displacement, and indicator means for providing intelligence indicative of the position of said panel relative to said discharge opening.

* * * * *